United States Patent Office 3,004,073
Patented Oct. 10, 1961

3,004,073
PROCESS TO PREPARE 1-PENTACHLOROPHE-NOXY-2,3-PROPANEDIOL
Marco Wismer, Gibsonia, and William R. Hydro, New Kensington, Pa., assignors to Pittsburgh Plate Glass Company, Allegheny County, Pa., a corporation of Pennsylvania
No Drawing. Filed May 5, 1959, Ser. No. 811,003
8 Claims. (Cl. 260—613)

This invention relates to a novel method of forming a polyol which contains a high percentage of halogen attached to a benzene ring, is useful as an intermediate in the preparation of flame-retardant resins, and it has particular relation to a novel method of forming a pentahalophenoxy propanediol such as 1-pentachlorophenoxy-2,3-propanediol, of the formula:

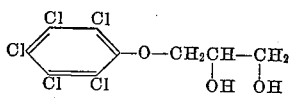

It is to be recognized that pentahalophenoxy propanediols such as 1-pentachlorophenoxy-2,3-propanediol, contain a high percentage of halogen attached to a benzene ring. Because of the presence of the hydroxyl groups, they can also be reacted with carboxylic acids to form useful esters which have flame-retardant properties in the cured state. Appropriate acids to react with the 1-pentahalophenoxy-2,3-propanediol to form polyesters comprise dicarboxylic acids such as maleic acid, fumaric acid, itaconic acid, or other alpha-beta ethylenically unsaturated acids endomethylene-Δ4-tetrahydrophthalic acid, chlorendic acid (or anhydrides thereof). These react with the 1-pentahalophenoxy-2,3-propanediol to form polyesters that can be homopolymerized or interpolymerized with monomers containing >C=CH$_2$ groups. In either event, it is possible to provide highly flame-retardant resins.

It is also possible to react the 1-phentahalophenoxy-2,3-propanediol with acids, or anhydrides of acids, which are non-ethylenic dicarboxylic acids. Representatives of this class are succinic acid, sebacic acid and others. Dicarboxylic acids such as phthalic acid, tetrachlorophthalic acid, isophthalic acid, terephthalic acid and others, in which the double bonds are benzenoid, may also be reacted with 1-pentachlorophenoxy-2,3-propanediol to form polyesters which do not polymerize by ethylenic addition reaction. This type of polyester is well adapted for reaction with isocyanates such as tolylene diisocyanate, to form polyurethane resins.

Still other acids are monocarboxylic and preferably contain a terminal ethylenic group and are represented by acrylic and methacrylic acid. The resultant esters can be homopolymerized or interpolymerized with other monomers.

A method which can be used for forming the valuable pentahalophenoxy propanediols comprises the reaction of a sodium pentahalophenate such as sodium pentachlorophenate, with 1-chloro-2,3-dihydroxypropane in accordance with the equation:

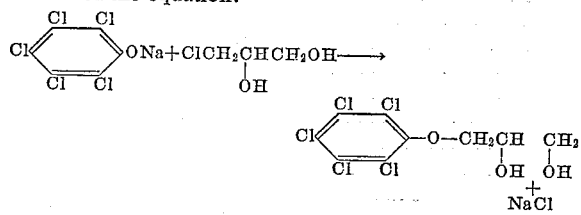

This method is not very satisfactory, inasmuch as the yields are low, being in a range between about 30 percent and about 50 percent.

This invention is based upon the discovery that 1-pentachlorophenoxy-2,3-propanediol and similar pentahalophenoxy propanediols can be easily prepared in almost quantitative yields (90 percent or higher) by hydrolysis, under proper conditions, of pentahalophenyl glycidyl ethers. The class is represented by pentachlorophenyl glycidyl ether, which can easily be prepared by reaction of pentachlorophenol with epicholorohydrin in the presence of alkali.

The hydrolysis of pentachlorophenyl glycidyl ether proceeds in accordance with the equation:

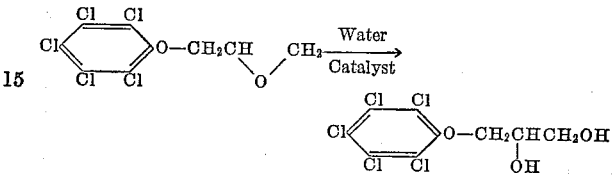

In conducting the hydrolysis of pentahalophenyl glycidyl ethers in accordance with provisions of this invention, it is essential to use an acid catalyst. Superior results are obtained by use of a relatively strong acid which is of relatively high boiling point, e.g., of a boiling point at atmospheric pressure above about 150° C., and being represented by sulfuric acid, phosphoric acid, pyrosulfuric acid, pyrophosphoric acid and polyphosphoric acid.

These acids may be used in a relatively wide range of concentrations, for example, in a range of about 0.1 to about 10 percent by weight based upon the pentahalophenyl glycidyl ether being hydrolyzed. Other amounts may be utilized, however.

The amount of water used in the hydrolysis may also vary over a wide range, for example, in a range from about 1 mole to about 20 moles or more per mole of pentahalophenyl glycidyl ether being treated. Naturally, great excesses tend to be uneconomical, because of the increased demands for common solvent for the constituents in the reaction mixture.

The temperature of reaction is usually that of refluxing of the mixture and in most instances, is in a range of about 50° C. to about 200° C. At the higher temperatures, it may be necessary to conduct the reaction under superatmospheric pressures in order to retain the water and other volatile constituents in the system. Reaction is continued for such period as the epoxy value of the mixture continues to fall and/or the hydroxyl value continues to rise. Usually, the hydrolysis is completed in about 1 to about 20 hours.

The preparation of pentabromophenyl glycidyl ether by the reaction of pentabromophenol and epichlorohydrin in the presence of alkali, is illustrative of the preparation of pentahalophenyl glycidyl ethers which can be hydrolyzed to form the corresponding diols, using the techniques of this invention. The process is as follows:

*Example A*

In this example, pentabromophenol is mixed with a large excess of epichlorohydrin and reacted in the presence of alkali (caustic soda) to provide pentabromophenyl glycidyl ether. The reaction charge comprises:

| | Grams |
|---|---|
| Pentabromophenol (1.5 moles) | 696 |
| Epichlorohydrin (15.0 moles) | 1,390 |
| Sodium hydroxide (1.75 moles) | 70 |

In conducting the reaction, the pentabromophenol and the epichlorohydrin, along with a 12-gram portion of the caustic soda, are charged into an appropriate container. The latter is equipped with an agitator, a thermometer, a condenser and a separator for separating water evolved by the reaction, from the condensate of epichlorohydrin. The reaction mixture is maintained at a reflux temperature which is within the range of about 100 to about 103° C. During the course of the reaction, the remainder of the caustic soda is added in 12-gram increments as required to maintain the reaction and to avoid too great an excess of caustic. The total reaction time is 5 hours, 40 minutes, and during this time, 28 milliliters of water are condensed. When the condensation of water substantially ceases, the reaction can be regarded as complete.

At the conclusion of one such cook, the charge was diluted with more epichlorohydrin and filtered while hot. The epichlorohydrin solution was then placed overnight in a cold room to crystallize out pentabromophenyl glycidyl ether. The next day, the pentabromophenyl glycidyl ether was filtered and sucked dry, and was then washed twice with cold methyl ethyl ketone. The washed product was dried in the vacuum oven overnight at a temperature of 70° C. to 80° C.

The mother liquor was again concentrated by evaporation and then placed in the cold room, and the foregoing operations of filtration, washing and drying were repeated to provide more crystalline product and a further mother liquor which was concentrated, cooled and filtered to provide still more product. The latter product was washed with methyl ethyl ketone. The crystals from the first fractionation had an epoxy value of 542.8 as against a theoretical value of 544.6.

The crystalline pentabromophenyl glycidyl ether obtained was suitable for hydrolysis to form 1-pentabromophenoxy-2,3-propanediol in the manner that will be described in Example I to follow.

The technique of this example could also be applied to the preparation of the corresponding pentachloro-, pentafluoro- or pentaiodophenyl glycidyl ethers. In such reaction, the pentachlorophenol, pentafluorophenol or the pentaiodophenol is substituted for the pentabromophenol and is then reacted with epichlorohydrin in the manner illustrated above.

*Example I*

This example illustrates the hydrolysis of pentabromophenyl glycidyl ether such as that from Example A, using sulfuric acid as a catalyst in accordance with the provisions of the present invention. The reaction charge comprises:

| | Parts by weight |
|---|---|
| Pentabromophenyl glycidyl ether | 443.3 |
| Dioxane (nonreactive diluent) | 2220.0 |
| Water | 326.0 |
| Sulfuric acid | 19.3 |

In a specific example of the hydrolysis, the foregoing charge was placed in a reaction vessel equipped with a reflux condenser, and was heated to refluxing temperature and was then further heated for 9¼ hours, after which it was allowed to stand overnight and refluxing was resumed the next morning and was continued for 1½ hours. It was then deemed that the hydrolysis was substantially complete.

The reaction mixture was neutralized with aqueous sodium hydroxide of 50 percent concentration. The solvent (dioxane) was distilled azeotropically with water under vacuum. The mixture was diluted with about 1700 parts by weight of toluene and the water in the mixture was then distilled azeotropically with the toluene. Subsequently, the toluene solution was heated to 105° C. and filtered. The clear brown filtrate was placed in a cold room for several hours and light brown crystals were obtained from the cold solution. The crystals were filtered off and the toluene filtrate was concentrated, and a second crop of crystals was taken and combined with the first crystals.

For further purification of the product, in the event a more highly purified material is desired, the following program may be followed:

(A) The crystals from the toluene solution are dissolved in hot benzene and treated with 10 percent of adsorbent carbon black (Darco) and the solution is filtered to remove carbon black and cooled to effect crystallization. A light yellow crystal product is obtained and a light yellow liquor is separated.

(B) The crystal product is dissolved in hot benzene and treated a second time with adsorbent carbon. From the solution, white crystals are obtained and the mother liquor is almost colorless.

(C) If further purification is desired, the crystals are dissolved still again in benzene and treated with adsorbent carbon in an amount of 2 percent by weight based upon the solution. The crystals from this solution are also white and the mother liquor obtained is colorless. The crystals are dried under a vacuum of 25 inches of mercury at a temperature of 90° C. The product has a hydroxyl value of 197.1 as against a theoretical hydroxyl value of 199.5.

The 1-pentabromophenoxy-2,3-propanediol may be reacted with saturated or unsaturated dicarboxylic acids, or with acrylic or methacrylic acids, to provide esters appropriate for the preparation of synthetic resins. For example, the 1-pentabromophenoxy-2,3-propanediol may be esterified with maleic acid to provide a polyester which can be mixed with styrene or with diallyl phthalate, or other appropriate monomers, and interpolymerized in the presence of a peroxide catalyst to provide resins which are of improved resistance to flame.

*Example II*

This example illustrates the hydrolysis of pentachlorophenoxy glycidyl ether with water in the presence of sulfuric acid as a catalyst. The reaction charge comprised:

| | Parts by weight |
|---|---|
| Pentachlorophenyl glycidyl ether | 350.0 |
| Dioxane (solvent) | 423.0 |
| Water | 78.4 |
| Sulfuric acid (concentrated) | 7.0 |

The foregoing mixture was refluxed for 7 hours. The product was crystallized out of solution and was washed with water. The solution was then heated in toluol and a clear yellow solution was obtained, and the solution was neutralized with aqueous sodium hydroxide. The solution was subjected to distillation under vacuum upon a steam bath. Water was then added and the product was heated above its melting point. The water-salt solution was subsequently decanted and the product was washed with additional water. This operation was repeated and the melted product was poured into trays and dried under vacuum. The yield of product (1-pentachlorophenoxy-2,3-propanediol) was 91.8 percent.

*Example III*

In this example, comparative tests of a number of different acids and bases as catalysts of the hydrolysis of pentachlorophenyl glycidyl ether to form 1-pentachlorophenoxy-2,3-propanediol were conducted. The catalysts tested were as follows:

| Number: | Catalyst |
|---|---|
| 1 | Sulfuric acid. |
| 2 | Phosphoric acid. |
| 3 | Glacial acetic acid. |
| 4 | Nitric acid. |
| 5 | Formic acid. |
| 6 | Oxalic acid. |
| 7 | Benzoic acid. |
| 8 | Trichloroacetic acid. |
| 9 | Hydrochloric acid. |
| 10 | p-Toluene sulfonic acid. |
| 11 | Calcium hydroxide. |
| 12 | Potassium hydroxide. |
| 13 | Sodium carbonate. |
| 14 | Control (no catalyst). |

The reaction charge employed in test 1 (sulfuric acid) corresponded to that of Example II. The reaction charge employed in tests 2–7, 10, 11, 12 and 13 comprised:

| | |
|---|---|
| Pentachlorophenyl glycidyl ether_____grams__ | 40.2 |
| Dioxane _____milliliters__ | 142.0 |
| Water _____do____ | 20.5 |
| Catalyst[1] _____grams__ | 0.8 |

[1] 2 percent by weight based upon the pentachlorophenyl glycidyl ether.

The foregoing mixtures were, in each instance, refluxed for about 21 hours. The mixtures were then neutralized with caustic soda and the dioxane was stripped. Water was added and distilled azeotropically to remove dioxane and the solid product was dried in a vacuum oven.

The charge employed in test 8 (trichloroacetic acid) comprised:

| | Parts by weight |
|---|---|
| Pentachlorophenyl glycidyl ether_____ | 64.6 |
| Dioxane _____ | 94.3 |
| Water _____ | 14.4 |
| Trichloroacetic acid_____ | 1.9 |

The reaction product was refluxed for 7¾ hours at 88° C.

The reaction charge employed in test 9 (hydrochloric acid) comprised:

| | |
|---|---|
| Pentachlorophenyl glycidyl ether_____grams__ | 64.4 |
| Dioxane _____milliliters__ | 150.0 |
| Water _____grams__ | 9.8 |
| Hydrochloric acid[1]_____milliliters__ | 7.3 |

[1] 2 percent calculated as 100 percent acid by weight based upon the pentachlorophenyl glycidyl ether.

The mixture was refluxed for 6½ hours and 5 milliliters of additional hydrochloric acid were added. The mixture was then further refluxed for 15¼ hours, or a total of 21¾ hours.

The dioxane was stripped under vacuum and the product was dissolved in toluene and the solution was cooled to crystallize out 38.3 grams of a white product, having a hydroxyl value of 153 upon a 100 percent solids basis. Further crystallization and cooling of the mother liquor gave 29.9 grams of additional solid product.

In the control, test 14, the reaction charge comprised:

| | Grams |
|---|---|
| Pentachlorophenyl glycidyl ether_____ | 64.4 |
| Dioxane _____ | 101.7 |
| Water _____ | 14.4 |
| Catalyst _____ | None |

The mixture was refluxed at 90° C. for 8 hours, 40 minutes, and was allowed to stand overnight and the next day was refluxed for 15 hours, 10 minutes. The dioxane was stripped, the solution was cooled, and the crystals deposited were then filtered.

In this test, no substantial hydrolysis occurred. The epoxy value of the solid product was 328 as against a theoretical value of 322.

The results of these several tests are tabulated as follows:

| Number | Catalyst | Color | OH Value (100% Solids) |
|---|---|---|---|
| 1 | Sulfuric acid | White | 304.0 |
| 2 | Phosphoric acid | do | 228.0 |
| 3 | Glacial acetic acid | do | 29.6 |
| 4 | Nitric acid | Light tan | 46.9 |
| 5 | Formic acid | do | 54.8 |
| 6 | Oxalic acid | White | 190.0 |
| 7 | Benzoic acid | do | 59.3 |
| 8 | Trichloroacetic acid | do | 126.0 |
| 9 | Hydrochloric acid | do | 153.0 |
| 10 | p-Toluene sulfonic acid | do | 123.0 |
| 11 | Calcium hydroxide | do | 78.3 |
| 12 | Potassium hydroxide | do | 31.6 |
| 13 | Sodium carbonate | do | 93.8 |
| 14 | Control (no catalyst) | do | No hydrolysis |

From the foregoing examples, it is apparent that the hydrolysis of pentahalophenyl glycidyl ether provides a simple and convenient method of forming 1-pentahalophenoxy-2,3-propanediols and that in this process, strong, high boiling acids and especially acids such as sulfuric acid and phosphoric acid, are outstandingly good, though other acids are of some effect.

In the foregoing examples, dioxane is disclosed as a nonreactive diluent. This is a mutual solvent for the water and the pentahalophenyl glycidyl ether, and performs very efficiently. It may be replaced by other nonreactive diluents, an appropriate partial list of common ones from which selection may be made is as follows:

Dimethyl ether of diethylene glycol
Dimethyl ether of triethylene glycol
Dimethyl ether of ethylene glycol
Dimethyl ether of tetraethylene glycol
 Ketones such as:
Methyl ethyl ketone
Methyl isobutyl ketone
Acetone
Isopropyl alcohol Mixtures may also be used.

The solvent or diluent should be substantially nonreactive with the other components in the mixture.

Since the diluent is nonreactive in the mixture, the proportions thereof are not critical. Naturally, enough should be present to dissolve a reasonable proportion of the reactants. Amounts from ¼ to 30 times the weight of the pentahalophenyl glycidyl ether are suggested by way of example.

The 1-pentahalophenoxy-2,3-propanediols prepared by the foregoing techniques, can be mixed with about equal moles of a dicarboxylic acid such as maleic acid or succinic acid, and about 5 to about 15 percent by weight based upon the charge of a reflux medium such as xylene. The mixture can be heated to reflux temperature to form and remove water, thus producing polyesters. The polyesters of the unsaturated acids can be mixed with a styrene, dichlorostyrene or other monomers which coreact with these unsaturated alkyds, together with a peroxidic catalyst such as benzoyl peroxide, and heated to form useful resins.

The esters of the unsaturated acid can be reacted with toluene diisocyanate in stoichiometric amounts based on hydroxyl and acid content of polyester and the amount of water added to produce useful polyurethane resin foams. Small amounts of emulsifiers and tertiary amine catalysts are essential to produce good foams.

We claim:
1. A method of forming a 1-pentahalophenoxy-2,3-propanediol which comprises heating a mixture of a pentahalophenyl glycidyl ether, in which the halogen is of an atomic weight between about 35 and about 80, and water in the presence of a mutual solvent and a strong, mineral acid boiling above about 150° C.

2. The method of claim 1 in which the acid is selected from the class consisting of sulfuric acid, phosphoric acid, pyrosulfuric acid and pyrophosphoric acid.

3. The method of claim 1 in which the acid is sulfuric acid and is used in an amount of about 0.1 to about 10 percent by weight based upon the pentahalophenyl glycidyl ether employed.

4. The method of preparing a 1-pentahalophenoxy-2,3-propanediol selected from the class consisting of 1-pentachlorophenoxy-2,3-propanediol, 1-pentabromophenoxy-2,3-propanediol, 1-pentaiodophenoxy-2,3-propanediol and 1-pentafluorophenoxy-2,3-propanediol, which comprises heating to a temperature of about 50° C. to about 200° C. a mixture of a glycidyl ether selected from the class consisting of pentachlorophenyl glycidyl ether, pentabromophenyl glycidyl ether, pentaiodophenyl glycidyl ether and pentafluorophenyl glycidyl ether, water, a mutual solvent and a strong, mineral acid boiling above about 150° C., until said glycidyl ether is hydrolyzed.

5. The method according to claim 4 in which the pentahalophenyl glycidyl ether is pentachlorophenyl glycidyl ether and the catalyst is sulfuric acid.

6. A method of preparing a 1-pentahalophenoxy-2,3-propanediol wherein the halogen atoms are of a weight between about 35 and about 80, which comprises the steps of mixing a pentahalophenyl glycidyl ether with water, a strong mineral acid boiling above about 150° C. and a mutual nonreactive diluent, and heating the mixture at a temperature of about 50° C. to about 200° C. until said 1-pentahalophenoxy-2,3-propanediol is formed.

7. The method of claim 6 in which the diluent is dioxane.

8. The method of claim 6 in which the diluent is dioxane and the acid is sulfuric acid.

References Cited in the file of this patent

UNITED STATES PATENTS

| | | |
|---|---|---|
| 2,221,771 | Alquist et al. | Nov. 19, 1940 |

FOREIGN PATENTS

| | | |
|---|---|---|
| 1,164,529 | France | Oct. 10, 1958 |

OTHER REFERENCES

Lucas et al.: Jour. Amer. Chem. Soc., volume 63 (1941) pages 22–28.